United States Patent
Bhogal et al.

(10) Patent No.: US 8,850,451 B2
(45) Date of Patent: Sep. 30, 2014

(54) SUBSCRIBING FOR APPLICATION MESSAGES IN A MULTICAST MESSAGING ENVIRONMENT

(75) Inventors: Kulvir S. Bhogal, Fort Worth, TX (US); Kenneth W. Borgendale, Austin, TX (US); Paul D. Lewis, Round Rock, TX (US); Ramanujam Ravisankar, Austin, TX (US); John J. Wang, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 11/609,604

(22) Filed: Dec. 12, 2006

(65) Prior Publication Data

US 2008/0141274 A1   Jun. 12, 2008

(51) Int. Cl.
*G06F 3/00* (2006.01)
*G06F 15/16* (2006.01)
*H04L 29/08* (2006.01)
*G06F 9/54* (2006.01)

(52) U.S. Cl.
CPC .............. *G06F 9/546* (2013.01); *H04L 67/02* (2013.01); *G06F 9/541* (2013.01)
USPC ............................ 719/313; 719/318; 709/206

(58) Field of Classification Search
CPC .......... G06Q 30/0255; G06Q 30/0269; G06Q 30/0257; G06F 17/30867; G06F 9/546; G06F 17/30699; H04L 67/306; H04L 67/18; H04L 67/327; H04L 67/2814; H04L 47/806; H04L 12/18; H04L 12/185; H04L 12/587
See application file for complete search history.

(56) References Cited

U.S. PATENT DOCUMENTS

| 4,787,035 | A | 11/1988 | Bourne |
| 4,947,429 | A | 8/1990 | Bestler et al. |
| 5,195,092 | A | 3/1993 | Wilson et al. |
| 5,732,274 | A | 3/1998 | O'Neil |
| 5,809,028 | A | 9/1998 | Nethercott et al. |
| 5,809,337 | A | 9/1998 | Hannah et al. |
| 5,940,843 | A | 8/1999 | Zucknovich et al. |
| 5,987,432 | A | 11/1999 | Zusman et al. |

(Continued)

FOREIGN PATENT DOCUMENTS

| EP | 1 039 410 A | 9/2000 |
| EP | 2007/055851 | 6/2007 |
| WO | WO9900753 A1 | 1/1999 |
| WO | WO 2005/045670 A | 5/2005 |

OTHER PUBLICATIONS

U.S. Appl. No. 11/780,826, filed Jul. 20, 2007, Berezuk, et al.

(Continued)

*Primary Examiner* — Tuan Dao
(74) *Attorney, Agent, or Firm* — DeLizio Gilliam, PLLC

(57) ABSTRACT

Methods, systems, and products for subscribing for application messages in a multicast messaging environment as disclosed that include: requesting, by a message receiving device, a stream administration server to initialize a message subscription for application messages from a message sending device; receiving, in the message receiving device from the stream administration server, a data communications endpoint of a multicast message stream from the message sending device; beginning to listen, by the message receiving device, for the application messages at the data communications endpoint; and notifying, by the message receiving device after beginning to listen for the application messages, the message sending device to publish the application messages at the data communications endpoint.

18 Claims, 7 Drawing Sheets

(56) References Cited

U.S. PATENT DOCUMENTS

| | | |
|---|---|---|
| 6,125,391 A | 9/2000 | Meltzer et al. |
| 6,141,324 A | 10/2000 | Abbott et al. |
| 6,160,874 A | 12/2000 | Dickerman et al. |
| 6,694,316 B1 | 2/2004 | Langseth et al. |
| 6,725,446 B1 | 4/2004 | Hahn et al. |
| 6,757,710 B2 | 6/2004 | Reed |
| 6,901,428 B1 | 5/2005 | Frazier et al. |
| 6,910,078 B1 | 6/2005 | Raman et al. |
| 6,954,454 B1 | 10/2005 | Schuster et al. |
| 7,113,520 B1 | 9/2006 | Meenan |
| 7,120,165 B2 | 10/2006 | Kasvand-Harris et al. |
| 7,225,195 B2 | 5/2007 | Avrahami et al. |
| 7,283,904 B2 | 10/2007 | Benjamin et al. |
| 7,415,715 B2 | 8/2008 | Fradkov et al. |
| 7,448,043 B2 | 11/2008 | Shenfield et al. |
| 2001/0016783 A1 | 8/2001 | Graumann et al. |
| 2001/0049743 A1 | 12/2001 | Phippen et al. |
| 2002/0019812 A1 | 2/2002 | Board et al. |
| 2002/0022952 A1 | 2/2002 | Zager et al. |
| 2002/0023040 A1 | 2/2002 | Gilman et al. |
| 2002/0083097 A1 | 6/2002 | Warrington |
| 2002/0086688 A1 | 7/2002 | Kang |
| 2002/0161900 A1 | 10/2002 | Brown et al. |
| 2002/0169706 A1 | 11/2002 | Chandra et al. |
| 2002/0172155 A1 | 11/2002 | Kasvand-Harris et al. |
| 2003/0073406 A1 | 4/2003 | Benjamin et al. |
| 2003/0115291 A1 | 6/2003 | Kendall et al. |
| 2003/0115548 A1 | 6/2003 | Melgar |
| 2003/0158805 A1 | 8/2003 | Mozhdehi |
| 2003/0204719 A1 | 10/2003 | Ben-Itzhak |
| 2004/0024753 A1 | 2/2004 | Chane et al. |
| 2004/0024845 A1 | 2/2004 | Fishhaut et al. |
| 2004/0034591 A1 | 2/2004 | Wailbroeck et al. |
| 2004/0054744 A1 | 3/2004 | Karamchedu et al. |
| 2004/0148357 A1 | 7/2004 | Corrigan et al. |
| 2004/0190459 A1 | 9/2004 | Ueda et al. |
| 2004/0193703 A1 | 9/2004 | Loewy et al. |
| 2004/0199524 A1 | 10/2004 | Rys et al. |
| 2004/0205439 A1* | 10/2004 | Carmeli et al. ............... 714/748 |
| 2004/0216135 A1 | 10/2004 | Heimbeck |
| 2004/0255302 A1* | 12/2004 | Trossen ...................... 719/318 |
| 2005/0010311 A1 | 1/2005 | Barbazette et al. |
| 2005/0028195 A1 | 2/2005 | Feinleib et al. |
| 2005/0028208 A1 | 2/2005 | Ellis et al. |
| 2005/0044197 A1 | 2/2005 | Lai |
| 2005/0102218 A1 | 5/2005 | Sargent et al. |
| 2005/0105533 A1 | 5/2005 | Malolepsy et al. |
| 2005/0149543 A1 | 7/2005 | Cohen et al. |
| 2005/0195820 A1 | 9/2005 | Betts et al. |
| 2005/0222931 A1 | 10/2005 | Mamou et al. |
| 2005/0246186 A1* | 11/2005 | Nikolov ........................ 705/1 |
| 2005/0246423 A1 | 11/2005 | Starbuck et al. |
| 2005/0254508 A1 | 11/2005 | Aksu et al. |
| 2005/0261923 A1 | 11/2005 | Brown et al. |
| 2005/0262025 A1 | 11/2005 | Wajih et al. |
| 2005/0273408 A1 | 12/2005 | Bandman et al. |
| 2006/0085507 A1 | 4/2006 | Zhao et al. |
| 2006/0143307 A1 | 6/2006 | Codignotto |
| 2006/0149840 A1 | 7/2006 | Thompson et al. |
| 2006/0168070 A1* | 7/2006 | Thompson et al. ........... 709/206 |
| 2006/0206440 A1 | 9/2006 | Anderson et al. |
| 2006/0242240 A1 | 10/2006 | Parker et al. |
| 2006/0269148 A1 | 11/2006 | Farber et al. |
| 2007/0038543 A1 | 2/2007 | Weinstein |
| 2007/0038712 A1 | 2/2007 | Affronti et al. |
| 2007/0073907 A1 | 3/2007 | Factor et al. |
| 2007/0091789 A1 | 4/2007 | Thukral |
| 2007/0106813 A1 | 5/2007 | Bordes et al. |
| 2007/0150918 A1 | 6/2007 | Carpenter et al. |
| 2007/0233728 A1 | 10/2007 | Puteick et al. |
| 2007/0271447 A1 | 11/2007 | Agarwala et al. |
| 2007/0299936 A1 | 12/2007 | Borgendale et al. |
| 2007/0299973 A1 | 12/2007 | Borgendale et al. |
| 2007/0300233 A1 | 12/2007 | Bhogal et al. |
| 2007/0300234 A1 | 12/2007 | Dekel et al. |
| 2007/0300235 A1* | 12/2007 | Dekel et al. ................... 719/313 |
| 2008/0010487 A1 | 1/2008 | Dekel et al. |
| 2008/0069141 A1 | 3/2008 | Bonaguro et al. |
| 2008/0103949 A1 | 5/2008 | Lobana et al. |
| 2008/0104266 A1 | 5/2008 | Dekel et al. |
| 2008/0114839 A1 | 5/2008 | Borgendale et al. |
| 2008/0114938 A1 | 5/2008 | Borgendale et al. |
| 2008/0137830 A1 | 6/2008 | Bhogal et al. |
| 2008/0140550 A1 | 6/2008 | Berezuk et al. |
| 2008/0141272 A1 | 6/2008 | Borgendale et al. |
| 2008/0141273 A1 | 6/2008 | Borgendale et al. |
| 2008/0141275 A1 | 6/2008 | Borgendale et al. |
| 2008/0141276 A1 | 6/2008 | Borgendale et al. |
| 2008/0243675 A1 | 10/2008 | Parsons et al. |
| 2008/0244017 A1 | 10/2008 | Gershinsky et al. |
| 2009/0006559 A1 | 1/2009 | Bhogal et al. |
| 2009/0006560 A1 | 1/2009 | Bhogal et al. |

OTHER PUBLICATIONS

"PCQuote.com Releases PCQuote Oribit", PR Newswire, New York: Nov. 2, 1999. p. 1.
"FirstQuote Provides Financial Information Services for Brokat E-Finance Application", PR newswire, New York: Feb. 21, 2000.
Speakman, et al.; RFC 3208—PGM Reliable Transport Protocol Specification; www.faqs.org; 2001; pp. 1-72; RFC 3208; Network Working Group.
PCT Search Report and Written Opinion, Jun. 5, 2008; PCT Application No. PCT/EP2007/063194.
PCT Search Report and Written Opinion, Feb. 4, 2008; PCT Application No. PCT/EP2007/063239.
PCT Search Report and Written Opinion, Jul. 7, 2008; PCT Application No. PCT/EP2008/053370.
PCT Search Report and Written Opinion, Sep. 14, 2007; PCT Application No. PCT/EP2007/055851.
Office Action Dated Oct. 30, 2008 in U.S. Appl. No. 11/780,826.
Office Action Dated Mar. 19, 2009 in U.S. Appl. No. 11/559,425.
Office Action Dated May 6, 2009 in U.S. Appl. No. 11/559,434.
Office Action Dated May 8, 2009 in U.S. Appl. No. 11/586,076.
Office Action Dated Mar. 6, 2009 in U.S. Appl. No. 11/426,764.
Office Action Dated Feb. 6, 2009 in U.S. Appl. No. 11/567,898.
Office Action Dated Apr. 6, 2009 in U.S. Appl. No. 11/608,904.
Office Action Dated Apr. 14, 2009 in U.S. Appl. No. 11/780,826.
Office Action Dated May 27, 2009 in U.S. Appl. No. 11/426,857.
Office Action Dated Jun. 1, 2009 in U.S. Appl. No. 11/769,240.
Office Action Dated Feb. 24, 2009 in U.S. Appl. No. 11/609,696.
Office Action Dated May 20, 2009 in U.S. Appl. No. 11/426,819.
Office Action Dated Jun. 2, 2009 in U.S. Appl. No. 11/426,864.
Office Action Dated Jun. 22, 2009 in U.S. Appl. No. 11/769,243.
Office Action Dated Jun. 25, 2009 in U.S. Appl. No. 11/426,849.
Neville, Jennifer et al. "Using relational knowledge discovery to prevent securities fraud." Proceedings of the eleventh ACM SIGKDD international conference on Knowledge discovery in data mining. Aug. 2005. ACM Press. 449-458.
Office Action Dated Dec. 10, 2009 in U.S. Appl. No. 11/426,849.
Office Action Dated Aug. 18, 2009 in U.S. Appl. No. 11/609,566.
Office Action Dated Jan. 22, 2010 in U.S. Appl. No. 11/609,604.
Final Office Action Dated Aug. 14, 2009 in U.S. Appl. No. 11/567,898.
Office Action Dated Aug. 28, 2009 in U.S. Appl. No. 11/426,789.
Final Office Action Dated Dec. 2, 2009 in U.S. Appl. No. 11/426,864.
Final Office Action Dated Apr. 17, 2009 in U.S. Appl. No. 11/780,826.
Final Office Action, U.S. Appl. No. 11/609,604, Apr. 19, 2010.
Office Action, U.S. Appl. No. 11/609,708, Apr. 19, 2010.
Final Office Action, U.S. Appl. No. 11/609,708, Sep. 8, 2010.
Office Action, U.S. Appl. No. 11/426,789, Oct. 6, 2010.
Office Action, U.S. Appl. No. 11/567,357, May 27, 2010.
Final Office Action, U.S. Appl. No. 11/567,357, Oct. 27, 2010.
Final Office Action, U.S. Appl. No. 11/426,849, Aug. 17, 2010.
Office Action, U.S. Appl. No. 11/728,850, Jul. 27, 2010.
Notice of Allowance, U.S. Appl. No. 11/728,850, Nov. 22, 2010.

* cited by examiner

SUBSCRIBING FOR APPLICATION MESSAGES IN A MULTICAST MESSAGING ENVIRONMENT

BACKGROUND OF THE INVENTION

1. Field of the Invention

The field of the invention is data processing, or, more specifically, methods, systems, and products for subscribing for application messages in a multicast messaging environment.

2. Description of Related Art

Messaging environments are generally available to provide data communication between message sending devices and message receiving devices using messages. A message is a quantity of data that includes one or more data fields and is passed from a message producer installed on a message sending device to a message consumer installed on a message receiving device. A message may represent, for example, numeric or textual information, images, encrypted information, and computer program instructions.

A messaging environment may support point-to-point messaging, publish and subscribe messaging, or both. In a point-to-point messaging environment, a message producer may address a message to a single message consumer. In a publish and subscribe messaging environment, a message producer may publish a message to a particular channel or topic and any message consumer that subscribes to that channel or topic receives the message. Because message producers and message consumers communicate indirectly with each other via a channel or topic in a publish and subscribe environment, message transmission is decoupled from message reception. As a consequence, neither producers nor consumers need to maintain state about each other, and dependencies between the interacting participants are reduced or eliminated. A publish and subscribe environment may, therefore, allow message publishers and message subscribers to operate asynchronously.

For further explanation of a messaging environment, FIG. 1 sets forth a block diagram illustrating a typical messaging environment for data communications that includes a message sending device (100), a message receiving device (104), and a message administration server (102). The message sending device (100) is a computer device having installed upon it a message producer (110), a set of computer program instructions configured for creating or transforming application messages. The message producer (110) typically transmits the messages to the message administration server (102) for delivery to a message receiving device. In the example of FIG. 1, the message producer (110) transmits messages to the message administration server (102) on a message stream (106). The message sending device (100) may produce the transmitted messages by generating the messages from data of the message sending device itself or data received from some other source. The message receiving device (104) is a computer device having installed upon it a message consumer (112), a set of computer program instructions configured for receiving and consuming application messages. The message consumer (112) typically receives the messages from the message administration server (102). In the example of FIG. 1, the message consumer (112) receives the messages from the message administration server (102) on a message stream (108). In the example of FIG. 1, the message stream (106) and the message stream (108) are data communication channels implemented using, for example, the User Datagram Protocol ('UDP') and the Internet Protocol ('IP').

In either a point-to-point messaging environment or a publish and subscribe messaging environment, the messages transmitted from message sending devices to message receiving devices typically pass through the message administration server (102). The message administration server (102) is computer device having installed upon it a message administration module (114), computer program instructions configured for administering the messages transmitted from the message producer (110) to the message consumer (112). Examples of message administration modules may include the IBM WebSphere® MQ, the Open Message Queue from Sun Microsystems, and the OpenJMS from The OpenJMS Group. In a point-to-point messaging environment, the message administration module (114) provides message queuing for the message consumer (112) as the message administration module (114) receives messages addressed to the consumer (112) from various message providers. In a publish and subscribe messaging environment, the message administration module (114) administers the various channels or topics to which message producers publish and message consumers subscribe. In either message environment, the message administration module (114) may also provide security services to ensure that the only messages arriving at the messaging consumer (112) from the message producer (110) are those messages that the message consumer (112) is authorized to receive and that the message producer (110) is authorized to send.

Current messaging environments such as, for example, the one described above with reference to FIG. 1, have certain drawbacks. Messages transmitted to a message administration server from a message sending device for delivery to a message receiving device are delayed in the message administration server until the message administration server can process the messages. The message processing that occurs in the message administration server typically increases the overall messaging latency of the messaging environment and decreases the overall speed for transmitting data in the data communications environment. Messaging latency is the time period beginning when the message producer transmits a message and ending when the message consumer receives the message.

In many data communication environments, even slight increases in messaging latency are costly. Consider, for example, a financial market data environment. A financial market data environment is a data processing environment used to communicate information about financial markets and participants in financial markets. In a financial market data environment, a message is commonly referred to as a 'tick' and represents financial market data such as, for example, financial quotes or financial news. Financial quotes include bid and ask prices for any given financial security. A 'bid' refers to the highest price a buyer is willing to pay for a security. An 'ask' refers to the lowest price a seller is willing to accept for a security. In a financial market data environment, a message producer may provide quotes for the purchase or sale of financial securities based on real-time financial market conditions, and a message consumer may buy and sell financial securities based on financial quotes. When a message consumer buys or sells a financial security based on the quoted price provided by the message producer, the ability of a message consumer to obtain the bid or ask in the quote for the financial security is largely influenced by messaging latency in the financial market data environment. The higher the messaging latency, the less likely a buy or sell order generated by the message consumer will execute at or near the price stated in the financial quote. In fact, a highly volatile security may fluctuate in price dramatically over a time period of a few seconds.

Current solutions to reduce messaging latency are to remove the message administration server from the messaging environment. In such current solutions, the message sending devices send messages directly to message receiving devices. The drawback to such current solutions is that removing the message administration server removes the administration functionality provided by the message administration server from the messaging environment. Current solutions, therefore, effectively offer no solution in messaging environments where the administrative functions of a message administration server are required. Consider, for example, a multicast messaging environment in which the message receiving device has no information about the state or existence of the message sending devices, and the message sending devices transmit application messages without regard to whether any devices are listening for the messages. In such an environment, further consider that the message receiving device requires that the transmission of messages from the message sending device does not occur until after the message receiving device has established a message stream to receive the messages. Removing the message administration server from such a financial market data environment removes the centralized entity capable of providing information about the various message sending devices in the environment to the message receiving device and removes the queuing capability provided by the message administration server.

SUMMARY OF THE INVENTION

Methods, systems, and products for subscribing for application messages in a multicast messaging environment as disclosed that include: requesting, by a message receiving device, a stream administration server to initialize a message subscription for application messages from a message sending device; receiving, in the message receiving device from the stream administration server, a data communications endpoint of a multicast message stream from the message sending device; beginning to listen, by the message receiving device, for the application messages at the data communications endpoint; and notifying, by the message receiving device after beginning to listen for the application messages, the message sending device to publish the application messages at the data communications endpoint.

In some embodiments, receiving a data communications endpoint may include receiving, in addition to the data communications endpoint, one or more alternate data communications endpoints. In such embodiments, subscribing for application messages in a multicast messaging environment may also include: identifying, by the message receiving device, a failure condition for the data communication endpoint; and switching, by the message receiving device in response to the failure condition, from listening for the application messages at the data communication endpoint to listening for the application messages at one of the alternate data communication endpoints.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
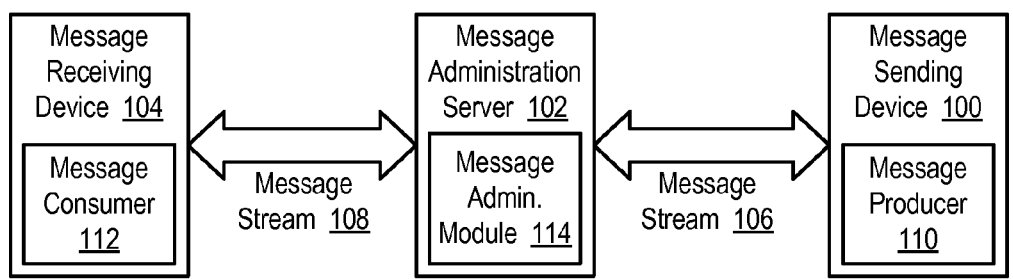
FIG. 1 sets forth a block diagram illustrating a typical messaging environment for data communications.
Figure 2:
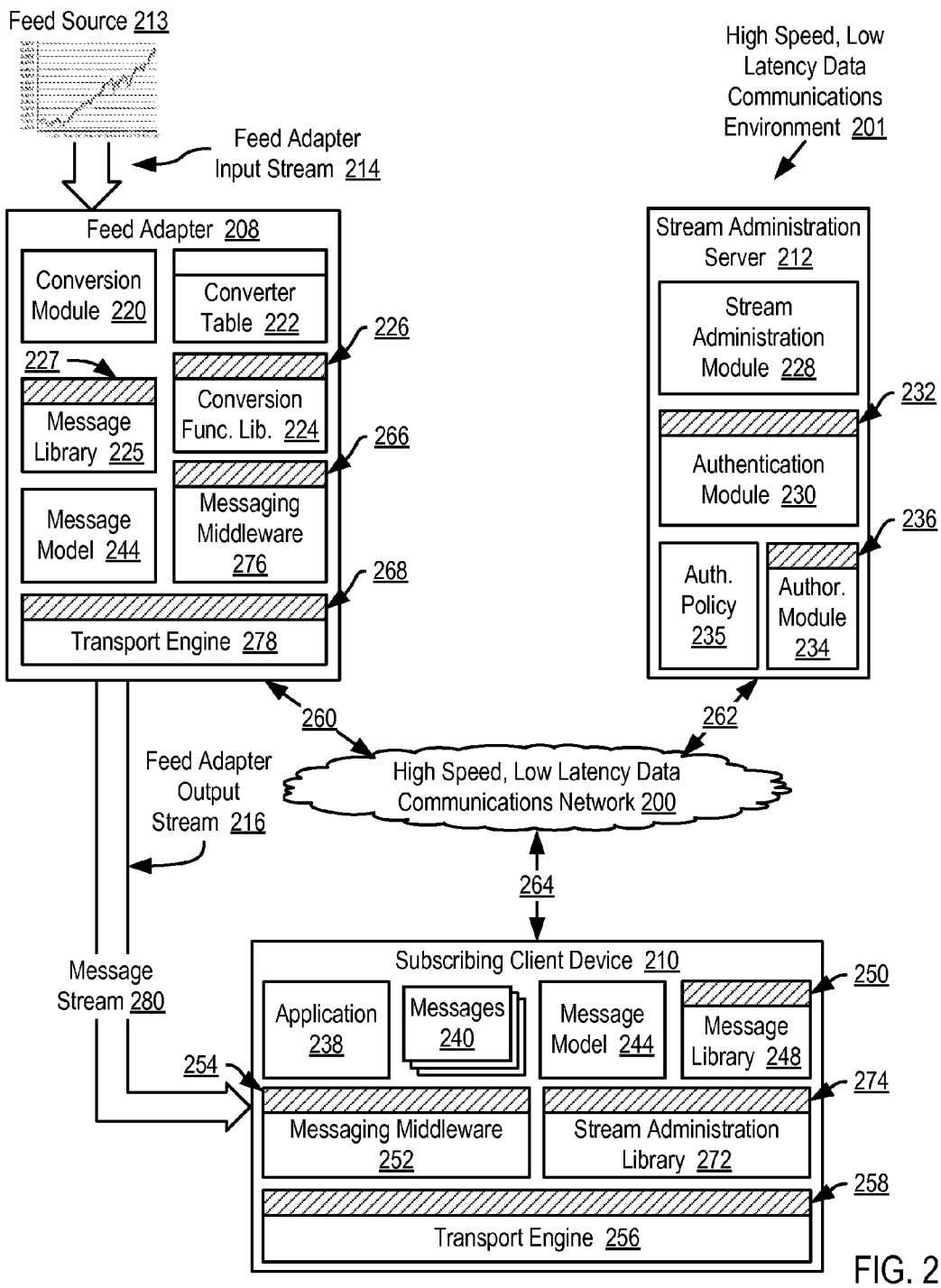
FIG. 2 sets forth a network and block diagram illustrating an exemplary system for subscribing for application messages in a multicast messaging environment according to exemplary embodiments of the present invention.

Exemplary methods, systems, and products for subscribing for application messages in a multicast messaging environment according to embodiments of the present invention are described with reference to the accompanying drawings, beginning with FIG. 2. FIG. 2 sets forth a network and block diagram illustrating an exemplary system for subscribing for application messages in a multicast messaging environment according to embodiments of the present invention. The system of FIG. 2 operates generally for subscribing for application messages in a multicast messaging environment according to embodiments of the present invention as follows: A message receiving device (210) requests a stream administration server to initialize a message subscription for application messages from a message sending device (208). A message subscription is a group of application messages for which a message receiving device is authorized to receive from a message sending device. The message receiving device (210) receives, from the stream administration server (212), a data communications endpoint of a multicast message stream (280) from the message sending device (208). The message receiving device (210) begins to listen for the application messages at the data communications endpoint. After beginning to listen for the application messages, the message receiving device (210) notifies the message sending device (208) to publish the application messages at the data communications endpoint. The message receiving device (210) may also notifying the message sending device (208) to stop publishing the application messages at the data communications endpoint. The message receiving device (210) may also request the stream administration server (212) to close the message subscription. In the exemplary system of FIG. 2, the message receiving device (210) is implemented as a subscribing client device, and the message sending device (208) is implemented as a feed adapter.

The high speed, low latency data communications environment (201) illustrated in FIG. 2 includes a high speed, low latency data communications network (200). The network (200) includes a feed adapter (208), a stream administration server (212), and a subscribing client device (210), as well as the infrastructure for connecting such devices (208, 212, 210) together for data communications. The network (200) of FIG. 2 is termed 'high speed, low latency' because the application messages sent between devices connected to the network (200) on message streams administered by the stream administration server (212) bypass the stream administration server (212). For example, the application messages on the message stream (280) from the feed adapter (208) to the subscribing client device (210) bypass the stream administration server (212). Although such messages are not delayed for processing in the stream administration server (212), the stream administration server (212) retains administration of the stream (280) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (208, 212, 210) provides its own routing functionality for data communication through a direct connection with the other devices connected to the network (200). Because the network (200) does not include a computer networking device dedicated to routing data packets, the network (200) of FIG. 2 may be referred to as a 'minimally routed network.' Although the exemplary network (200) illustrated in FIG. 2 does not include a router, such a minimally routed network is for explanation only. In fact, some high speed, low latency networks useful in subscribing for application messages in a multicast messaging environment according to embodiments of the present invention may include a router.

The high speed, low latency data communications environment (201) depicted in FIG. 2 includes a multicast message stream (280). A multicast message stream is a multicast data communication channel between a communications endpoint of a sending device and a communications endpoint of at least one receiving device. A communications endpoint is composed of a network address and a port for a sending device or a receiving device. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'), the Pragmatic General Multicast ('PGM') protocol, or any other multicast data communications protocols as will occur to those of skill in the art.

The exemplary system of FIG. 2 includes a stream administration server (212) connected to the high speed, low latency data communications network (200) through a wireline connection (262). The stream administration server (212) of FIG. 2 is a computer device having installed upon it a stream administration module (228), an authentication module (230), an authorization module (234), and an authorization policy (235). A stream administration module (228) is a software component that includes a set of computer program instructions configured for brokering establishment of a message stream (280) from the feed adapter (208) to the subscribing client device (210). The stream administration module (228) may broker the establishment of the message stream (280) by receiving a request from the subscribing client device (210) to initialize a message subscription, authenticating the subscribing client device (210), authorizing the subscribing client device (210) to receive application messages (240) from the feed adapter (208) on the message stream (280), and providing to the subscribing client device (210) a data communications endpoint of a message stream (280) from the message sending device (208). In addition to brokering the establishment of the message stream (280), the stream administration module (228) also includes a set of computer program instructions for performing other administrative functions in the messaging environment (201) such as, for example, notifying the feed adapter (208) to start publishing messages on the message stream (280) in response to a receiving a publication notification from the subscribing client device (210).

The authentication module (230) of FIG. 2 is a set of computer program instructions capable of providing authentication security services to the stream administration module (228) through an exposed authentication application programming interface ('API') (232). Authentication is a process of verifying the identity of an entity. In the exemplary system of FIG. 2, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 2 is a set of computer program instructions capable of providing authorization security services to the stream administration module (228) through an exposed authorization API (236). Authorization is a process of only allowing resources to be used by resource consumers that have been granted authority to use the resources. In the example of FIG. 2, the authorization module (234) identifies the application messages that the subscribing client device (210) is authorized to receive on the message stream (280). The authorization module (234) of FIG. 2 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group.

In the exemplary system of FIG. 2, feed adapter (208) is connected to the high speed, low latency data communications network (200) through a wireline connection (260). The feed adapter (208) is a computer device having the capabilities of converting application messages received on a feed adapter input stream (214) having a first format to application messages having a second format for transmission on a feed adapter output stream (216) to subscribing client devices. The feed adapter input stream (214) is a message stream from a feed source to the feed adapter (208). The feed adapter output stream (216) is a message stream administered by the stream administration server (212) from the feed adapter (208) to the subscribing client device (210).

In the example of FIG. 2, the feed adapter (208) receives application messages on the feed adapter input stream (214) from a feed source (213). The feed source (213) is a computer device capable of aggregating data into application messages and transmitting the messages to a feed adapter. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Center$^{SM}$ which is an electronic screen-based equity securities market in the United States. In a financial market data environment, a feed adapter input stream is referred to as a 'financial market data feed.'

The feed adapter (208) of FIG. 2 has installed upon it a conversion module (220), a converter table (222), conversion function library (224), a message library (225), a message model (244), messaging middleware (276), and a transport engine (278). The conversion module (220) is a set of computer program instructions for converting application messages received on the feed adapter input stream (214) having a first format into application messages (240) having a second format for transmission to subscribing devices on the feed adapter output stream (216).

The conversion module (220) converts application messages from the first format to the second format according to the converter table (222). The converter table (222) of FIG. 2 is a data structure that specifies the converter functions capable of converting the application message from one format to another format. Utilizing multiple converter tables, the conversion module (220) may convert messages from a variety of input formats to a variety of output formats. In the example of FIG. 2, the converter table (222) specifies the converter functions capable of converting the application message received from the feed adapter input stream (214) having the first format to application messages (240) having the second format for transmission to subscribing client devices on the feed adapter output stream (216). The converter table (222) of FIG. 2 may be implemented using a structured document such as, for example, an eXtensible Markup Language ('XML') document.

The conversion function library (224) of FIG. 2 is a loadable software module that contains one or more converter functions capable of converting data fields in an application message from one format to another format or converting values of data fields from one value to another value. The converter functions contained in the conversion function library may, for example, convert a 16-bit integer to a 32-bit integer, convert a number stored in a string field to a 64-bit double floating point value, increase the value of one data field by one, or any other conversion as will occur to those of skill in the art. The conversion module (220) accesses the converter functions through a set of converter function APIs (226) exposed by the converter functions of the conversion function library (224). In the example of FIG. 2, the conversion function library (224) may be implemented as dynamically linked libraries available to the conversion module (220) at runtime, statically linked libraries linked into the conversion module (220) at compile time, dynamically loaded Java classes, or any other implementation as will occur to those of skill in the art.

In the example of FIG. 2, the application messages (240) transmitted by the feed adapter (208) have a format specified in a message model (244). The message model (244) is metadata that defines the structure and the format used to create, access, and manipulate the application messages (240) converted from the application messages (not shown) received from the feed source (213). That is, the message model (244) specifies a message format for interpreting application messages and includes one or more field specifications. Each field specification specifies a message field for storing data in an application message and includes field characteristics of the message field. In the example of FIG. 2, the message model (244) is established on both the feed adapter (208) and the subscribing client device (210) by the stream administration server (212) when the stream administration server (212) brokers a message stream to a subscribing client device. A message model may be implemented using a structured document, such as, for example, an XML document, a Java object, C++ object, or any other implementation as will occur to those of skill in the art.

In the example of FIG. 2, the conversion module (220) and the converter functions of the conversion function library (224) process the data contained in the application messages (240) using the message library (225). The message library (225) is a software module that includes a set of functions for creating, accessing, and manipulating messages (240) according to a message model (244). The message library (225) is accessible to the conversion module (220), the converter functions of the conversion function library (224), and the messaging middleware (276) through a message API (227) exposed by the message library (225).

Before the conversion module (220) of FIG. 2 performs data processing on the application messages, the conversion module (220) receives application messages (not shown) having a first format from the feed source (213). The conversion module (220) of FIG. 2 may receive the source stream messages through a receiving transport engine (not shown) of the feed adapter (208). The receiving transport engine is a software module that operates in the transport layer of the network stack and may be implemented according to the UDP/IP protocols, the PGM protocol, or any other data communication protocol as will occur to those of skill in the art. The receiving transport engine may provide the received application messages directly to the conversion module (220) or to the messaging middleware (276), which in turn, provides the source stream messages to the conversion module (220).

After the conversion module (220) of FIG. 2 performs data processing on the application messages received from the feed source (213), the conversion module (220) provides the application messages having the second format to the messaging middleware (276). The messaging middleware (276) of FIG. 2 is a software component that provides high availability services between the feed adapter (208), any backup feed adapter that may exist, the subscribing client device (210), and the feed source (213). In addition, the messaging middleware (276) of FIG. 2 includes a set of computer program instructions configuring for subscribing for application messages in a multicast messaging environment according to embodiments of the present invention. The messaging middleware (276) operates generally for subscribing for application messages in a multicast messaging environment according to embodiments of the present invention by receiving a notification to publish the application messages, and increasing, in response to receiving the notification to publish the application messages, a value for a computer data element representing subscriber interest in the application messages. When the value representing subscriber interest is greater than zero, the messaging middleware (276) provides application messages having characteristics specified in the publication notification to the transport engine (278) for transmission to the subscribing client device (210). The messaging middleware (208) typically receives the publication notification from the stream administration server (212). The application messages provided to the transport engine (278) are received from the conversion module (220). The conversion module (220) interacts with the messaging middleware (276) through a messaging middleware API (266) exposed by the messaging middleware (276).

In the example of FIG. 2, the feed adapter (208) also provides the ability to stop publication of particular application messages on a message stream and stop the conversion of messages for which no subscribers desire publication. That is, the messaging middleware (276) also operates generally for subscribing for application messages in a multicast messaging environment according to embodiments of the present invention by receiving a notification to stop publishing the application messages, decreasing, in response to receiving the notification to stop publishing the application messages, a value for a computer data element representing subscriber interest in the application messages, determining whether the value for a computer data element representing subscriber interest in the application messages is below a predetermined threshold, and notifying a data provider to stop providing the application messages to the message sending device if the value for a computer data element representing subscriber interest in the application messages is below the predetermined threshold. In the example of FIG. 2, the data provider is implemented as the feed source (213). The feed adapter (208) notifies the feed source (213) to stop providing application messages when the value representing subscriber interest falls to zero because the feed adapter (208) no longer has any subscribers interested in the application messages. To distinguish between various types of messages transmitted by the feed adapter, the feed adapter may have multiple values, each value representing the subscriber interest for a particular type of application message.

The transport engine (278) of FIG. 2 is a software component operating in the transport and network layers of the OSI protocol stack promulgated by the International Organization for Standardization. The transport engine (278) provides data communications services between network-connected devices. The transport engine may be implemented according to the UDP/IP protocols, PGM protocol, or any other data communications protocols as will occur to those of skill in the art. The transport engine (278) is a software module that includes a set of computer program instructions for transmitting application messages to the subscribing client device (210). The transport engine (278) of FIG. 2 may transmit the application messages (240) by receiving the application messages from the messaging middleware (276), encapsulating the application messages provided by the messaging middleware (276) into transport packets, and transmitting the packets through the message stream (280) to the subscribing client device (210). The messaging middleware (276) operates the transport engine (278) through a transport API (268) exposed by the transport engine (278).

The subscribing client device (210) in exemplary system of FIG. 2 connects to the high speed, low latency data communications network (200) through a wireline connection (264). The subscribing client device (210) of FIG. 2 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 2, the subscribing client device (210) has installed upon it an application (238), a message library (248), a message model (244), messaging middleware (252), a stream administration library (272), and a transport engine (256). The application (238) is a software component that processes data contained in the application messages (240) received from the feed adapter (208). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

The application (238) processes the data contained in the application messages (240) using the message library (248). The message library (248) is software module that includes a set of functions for creating, accessing, and manipulating messages (240) according to the message model (244) that is installed on both the feed adapter (208) and the subscribing client device (210). The message library (248) is accessible to the application (238) through a message API (250) exposed by the message library (248).

The communications between the subscribing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the subscribing client device (210) of FIG. 2 may request to subscribe to messages from a feed adapter, modify an existing message subscription, or cancel a subscription. The stream administration library (272) includes a set of computer program instructions configured for subscribing for application messages in a message environment according to embodiments of the present invention. The stream administration library (272) operates generally for subscribing for application messages in a message environment according to embodiments of the present invention by requesting a stream administration server (212) to initialize a message subscription for application messages from a message sending device (208), receiving, in the message receiving device from the stream administration server (212), a data communications endpoint of a multicast message stream (280) from the message sending device (208), beginning to listen for the application messages at the data communications endpoint, and after beginning to listen for the application messages, notifying the message sending device (208) to publish the application messages at the data communications endpoint. When the stream administration library (272) receives the data communications endpoint, the stream administration library (272) may also receive, in addition to the data communications endpoint, one or more alternate data communications endpoints.

The stream administration library (272) also operates generally for subscribing for application messages in a message environment according to embodiments of the present invention by notifying the message sending device to stop publishing the application messages at the data communications endpoint, requesting the stream administration server to close the message subscription. Functions of the stream administration library (272) used by the application (238) may communicate with the stream administration server (212) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

Before the application (238) processes the data contained in the application messages (240), the application (238) receives the messages (240) from the messaging middleware (252), which, in turn, receives the application messages (240) from the feed adapter (208) through the transport engine (256). The messaging middleware (252) is a software component that provides high availability services between the subscribing client device (210), the feed adapter (208), any backup feed adapters, and the stream administration module (212). The messaging middleware (252) provides such high availability services by receiving the data communication endpoint of the message stream (280) and one or more alternate endpoints from the stream administration library (272). The messaging middleware (252) includes a set of computer program instructions for subscribing for application messages in a multicast messaging environment according to embodiments of the present invention by identifying a failure condition for the data communication endpoint, and switching, in response to the failure condition, from listening for the application messages at the data communication endpoint to listening for the application messages at one of the alternate data communication endpoints. The application (238) and the stream administration library (272) interact with the messaging middleware (252) through a messaging middleware API (254).

The transport engine (256) of FIG. 2 is a software component operating in the transport and network layers of the OSI protocol stack promulgated by the International Organization for Standardization. The transport engine (256) provides data communications services between network-connected devices. The transport engine may be implemented according to the UDP/IP protocols, PGM protocol, or any other data communications protocols as will occur to those of skill in the art. The transport engine (256) is a software component for receiving application messages (240) from the feed adapter (208). The transport engine (256) receives the application messages (240) by receiving transport packets through the message stream (280) from the feed adapter (208), unencapsulating the application messages (240) from the received packets, and provides the application messages (240) to messaging middleware (252) of the subscribing client device (210). In the example of FIG. 2, the messaging middleware (252) operates the transport engine (256) through a transport API (258) exposed by the transport engine (256).

The servers and other devices illustrated in the exemplary system of FIG. 2 are for explanation, not for limitation. Devices useful in subscribing for application messages in a multicast messaging environment may be implemented using general-purpose computers, such as, for example, computer servers or workstations, handheld computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 2 are for explanation, not for limitation. Although the connections to the network (200) of FIG. 2 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 2.

Subscribing for application messages in a multicast messaging environment in accordance with the present invention in some embodiments may be implemented with one or more message receiving devices, stream administration servers, and message sending devices. These devices and servers are, in turn, implemented to some extent at least as computers, that is, automated computing machinery. For further explanation, therefore, FIG. 3 sets forth a block diagram of automated computing machinery comprising an exemplary message receiving device (300) useful in subscribing for application messages in a multicast messaging environment according to embodiments of the present invention. The message receiving device (300) of FIG. 3 includes at least one computer processor (156) or 'CPU' as well as random access memory (168) ('RAM') which is connected through a high speed memory bus (166) and bus adapter (158) to processor (156) and to other components of the message receiving device.

Stored in RAM (168) is an application (238), messages (240), message model (244), a message library (248), a messaging middleware (252) a stream administration library (272), and a transport engine (256). Each application message (240) is a quantity of data that includes one or more data fields and is transmitted from one device to another on a message stream. As mentioned above, a message may represent numeric or textual information, images, encrypted information, computer program instructions, and so on. In a financial market data environment, for example, a message is commonly referred to as a 'tick' and represents financial market data such as, for example, financial quotes or financial news.

Each application message (240) may be implemented using a structured document such as, for example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The application (238), the message library (248), the messaging middleware (252), the stream administration library (272), and the transport engine (256) illustrated in FIG. 3 are software components, that is computer program instructions, that operate as described above with reference to the subscribing client device of FIG. 2.

Also stored in RAM (168) is an operating system (154). Operating systems useful in message receiving devices according to embodiments of the present invention include UNIX™, Linux™, Microsoft NT™, IBM's AIX™, IBM's i5/OS™, and others as will occur to those of skill in the art. The operating system (154), the application (238), the messages (240), the message model (244), the message library (248), the messaging middleware (252), and the transport engine (256) in the example of FIG. 3 are shown in RAM (168), but many components of such software typically are stored in non-volatile memory also, for example, on a disk drive (170).

Figure 3:
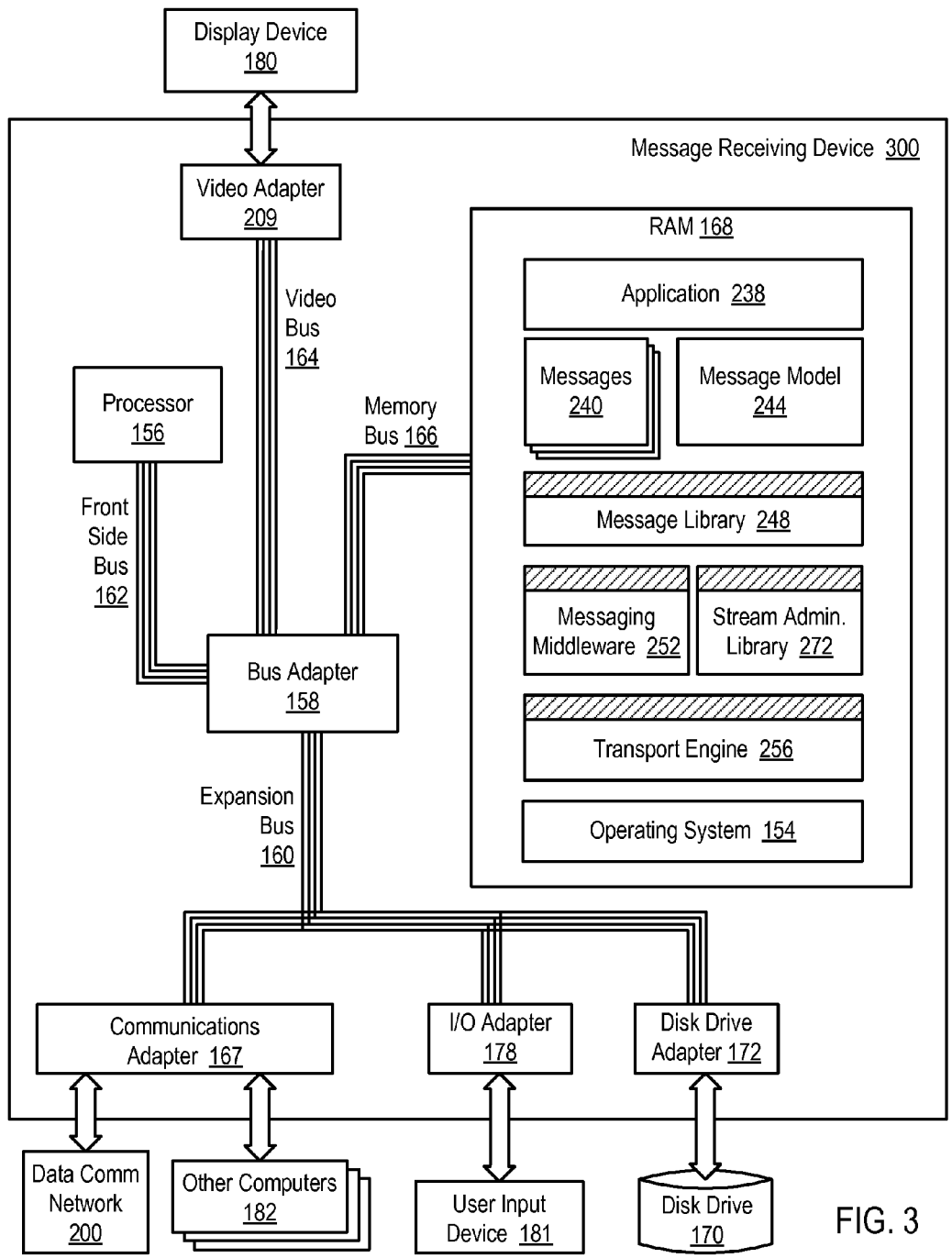
FIG. 3 sets forth a block diagram of automated computing machinery comprising an exemplary message receiving device useful in subscribing for application messages in a multicast messaging environment according to exemplary embodiments of the present invention.

The exemplary message receiving device (300) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in message receiving devices useful according to embodiments of the present invention include the Intel Northbridge, the Intel Memory Controller Hub, the Intel Southbridge, and the Intel I/O Controller Hub. Examples of expansion buses useful in message receiving devices useful according to embodiments of the present invention may include Peripheral Component Interconnect ('PCI') buses and PCI Express ('PCIe') buses.

The exemplary message receiving device (300) of FIG. 3 also includes disk drive adapter (172) coupled through expansion bus (160) and bus adapter (158) to processor (156) and other components of the exemplary message receiving device (300). Disk drive adapter (172) connects non-volatile data storage to the exemplary message receiving device (300) in the form of disk drive (170). Disk drive adapters useful in message receiving devices include Integrated Drive Electronics ('IDE') adapters, Small Computer System Interface ('SCSI') adapters, and others as will occur to those of skill in the art. In addition, non-volatile computer memory may be implemented for a message receiving device as an optical disk drive, electrically erasable programmable read-only memory (so-called 'EEPROM' or 'Flash' memory), RAM drives, and so on, as will occur to those of skill in the art.

The exemplary message receiving device (300) of FIG. 3 includes one or more input/output ('I/O') adapters (178). I/O adapters in message receiving devices implement user-oriented input/output through, for example, software drivers and computer hardware for controlling output to display devices such as computer display screens, as well as user input from user input devices (181) such as keyboards and mice. The exemplary message receiving device (300) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary message receiving device (300) of FIG. 3 includes a communications adapter (167) for data communications with other computers (182) and for data communications with a high speed, low latency data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for subscribing for application messages in a multicast messaging environment according to embodiments of the present invention include modems for wired dial-up communications, IEEE 802.3 Ethernet adapters for wired data communications network communications, and IEEE 802.11b adapters for wireless data communications network communications.

Although FIG. 3 is discussed with reference to exemplary message receiving devices, readers will note that automated computing machinery used to implement exemplary stream administration servers and exemplary message sending devices useful in subscribing for application messages in a multicast messaging environment according to embodiments of the present invention are similar to the exemplary message receiving device (300) of FIG. 3. That is, such exemplary stream administration servers and feed adapters include one or more processors, bus adapters, buses, RAM, video adapters, communications adapters, I/O adapters, disk drive adapters, and other components similar to the exemplary message receiving device (300) of FIG. 3 as will occur to those of skill in the art.

Figure 4:
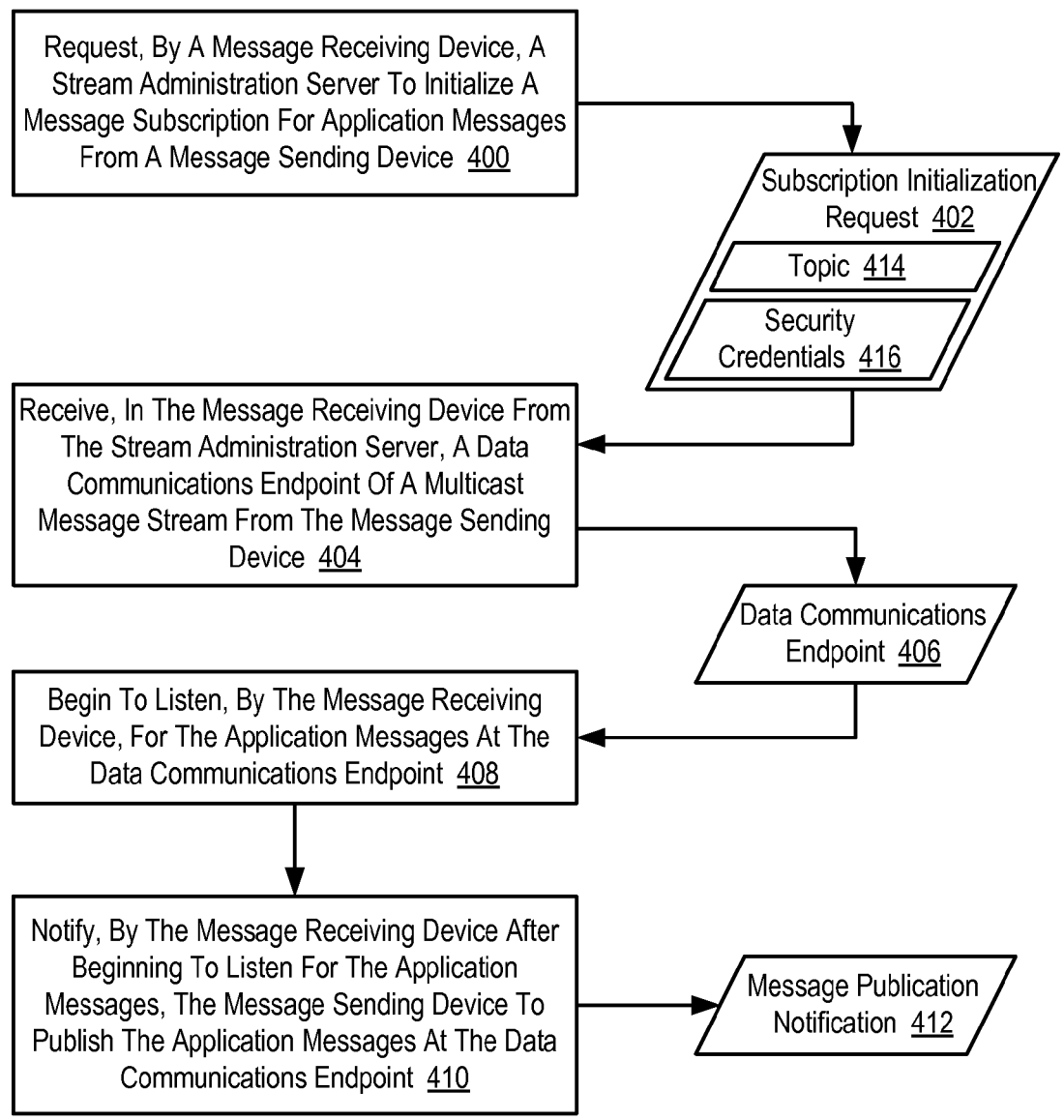
FIG. 4 sets forth a flowchart illustrating an exemplary method of subscribing for application messages in a multicast messaging environment according to exemplary embodiments of the present invention.

For further explanation, FIG. 4 sets forth a flowchart illustrating an exemplary method of subscribing for application messages in a multicast messaging environment according to embodiments of the present invention. The method of FIG. 4 includes requesting (400), by a message receiving device, a stream administration server to initialize a message subscription for application messages from a message sending device. The message receiving device may request (400) a stream administration server to initialize a message subscription for application messages from a message sending device by transmitting a subscription initialization request (402) to the stream administration server. The subscription initialization request (402) may be implemented as an XML document, a call to a member method of a RMI object on the message receiving device, or any other implementation as will occur to those of skill in the art. For example, consider the following exemplary subscription initialization request implemented as a member method of a RMI object:

endpoint*initialize_subscription(string topic);

The exemplary function 'initialize_subscription' instructs the stream administration server to initialize the message subscription for application messages having characteristics specified by the value of 'topic.' The exemplary function 'initialize_subscription' returns a pointer to a computer memory address where a data structure representing a data communication endpoint exists. Readers will note that the exemplary function described above is for explanation and not for limitation. In fact, other exemplary functions as will occur to those of skill in the art may also be useful in subscribing for application messages in a multicast messaging environment according to embodiments of the present invention.

The subscription initialization request (402) of FIG. 4 includes topics (414) of the application messages that the message receiving requests to receive from the message sending device. A topic represents the characteristics of the messages that the message receiving device requests to receive. Each application message typically includes a topic data field describing the information contained in the application message. Using a topic, a message receiving device may specify the group of messages that the message receiving device requests to receive from a message sending device. In a financial market data environment, for example, a message receiving device may use a topic to request to receive ticks from an OPRA feed source that contains quotes of an IBM option traded on the Chicago Board Options Exchange ('CBOE') that includes the best bid and best ask for the IBM option on the CBOE.

The subscription initialization request (402) of FIG. 4 also includes security credentials (416) for the message receiving device. As part of initializing the message subscription, the stream administration server typically authenticates the identity of the message receiving device and determines whether the message receiving device is authorized to receive the requested application messages. The security credentials (416) may be implemented as a digital signature in a public key infrastructure, a security token, or any other security data as will occur to those of skill in the art for authenticating the identity of the originator of the subscription initialization request (402). Examples of security token may include those security tokens described in the web services specification entitled 'Web Services Security' ('WS-Security') developed by IBM, Microsoft, and VeriSign or the web services specification entitled 'Web Services Trust Language' ('WS-Trust') developed by IBM, Microsoft, VeriSign, OpenNetworks, Layer 7, Computer Associates, BEA, Oblix, Reactivity, RSA Security, Ping Identity, and Actional.

If the stream administration server determines that the message receiving device is authorized to receive the requested application messages, the stream administration server may then continue to initialize the message subscription of application messages specified in the subscription initialization request (402). That is, the stream administration server may create or modify data structures in the stream administration server used to administer the message subscription, start processes on the stream administer server used to carry out the administration of the message subscription. The stream administration server may also identify and execute service providers used to manage the message sending devices and obtain, from one or more message sending devices, network addresses to which the message sending devices will transmit the application messages specified in the subscription initialization request (402), and perform any other subscription initialization as will occur to those of skill in the art.

The method of FIG. 4 also includes receiving (404), in the message receiving device from the stream administration server, a data communications endpoint (406) of a multicast message stream from the message sending device. The data communications endpoint (406) represents a data structure that includes a network address at which the message receiving device may listen for application messages from the message sending device. As mentioned above, the stream administration server typically obtains the network address to which a message receiving device may listen for application messages from the message sending device. The data communications endpoint (406) of FIG. 4 may be implemented according to the UDP/IP protocols, the PGM protocol, or any other data communications protocols as will occur to those of skill in the art.

The method of FIG. 4 also includes beginning to listen (408), by the message receiving device, for the application messages at the data communications endpoint (406). The message receiving device may begin to listen (408) for the application messages at the data communications endpoint (406) according to the method of FIG. 4 by calling a function from a transport engine API of a transport engine installed on the message receiving device that starts listening for application messages at the endpoint (406). Consider the following exemplary function useful for subscribing for application messages in a multicast messaging environment according to embodiments of the present invention:

buffer*transport_listen(int endpoint_ID);

The exemplary function 'transport_listen' instructs the transport engine of the message receiving device to listen for application message at a data communications endpoint identified by the value for the 'endpoint_ID.' The exemplary function 'transport_listen' returns an address in computer memory for a buffer in which the transport engine places application messages received through the data communications endpoint. Readers will note that the exemplary function described above is for explanation and not for limitation. In fact, other exemplary functions as will occur to those of skill in the art may also be useful in subscribing for application messages in a multicast messaging environment according to embodiments of the present invention.

The method of FIG. 4 also includes notifying (410), by the message receiving device after beginning to listen for the application messages, the message sending device to publish the application messages at the data communications endpoint. After beginning to listen for the application messages, the message receiving device may notify (410) the message sending device to publish the application messages at the data communications endpoint according to the method of FIG. 4 by transmitting a message publication notification (412) to the stream administration server. The stream administration server, then in turn, may instruct the message sending device to publish messages at the network address specified in the data communication endpoint (406). The message publication notification (412) may be implemented as an XML document, a call to a member method of a RMI object on the message receiving device, or any other implementation as will occur to those of skill in the art. Readers will note that notifying the message sending device to publish the application messages after the message receiving device begins to listen for the application messages advantageously ensures that message receiving device will not miss the first messages transmitted after the subscription is initialized.

Often in multicast messaging environments, a failure will occur on a message sending device that prevents the device from properly transmitting application messages to message receiving device. When such a failure occurs, the message receiving device may switch from listening for application messages from the failed message sending device at one data communications endpoint to listening for application messages from another message sending device at an alternate data communications endpoint. For further explanation, therefore, FIG. 5 sets forth a flowchart illustrating a further exemplary method of subscribing for application messages in a multicast messaging environment according to embodiments of the present invention that includes switching (508), by the message receiving device in response to the failure condition (506), from listening for the application messages at the data communication endpoint (406) to listening for the application messages at an alternate data communication endpoints (502).

Figure 5:
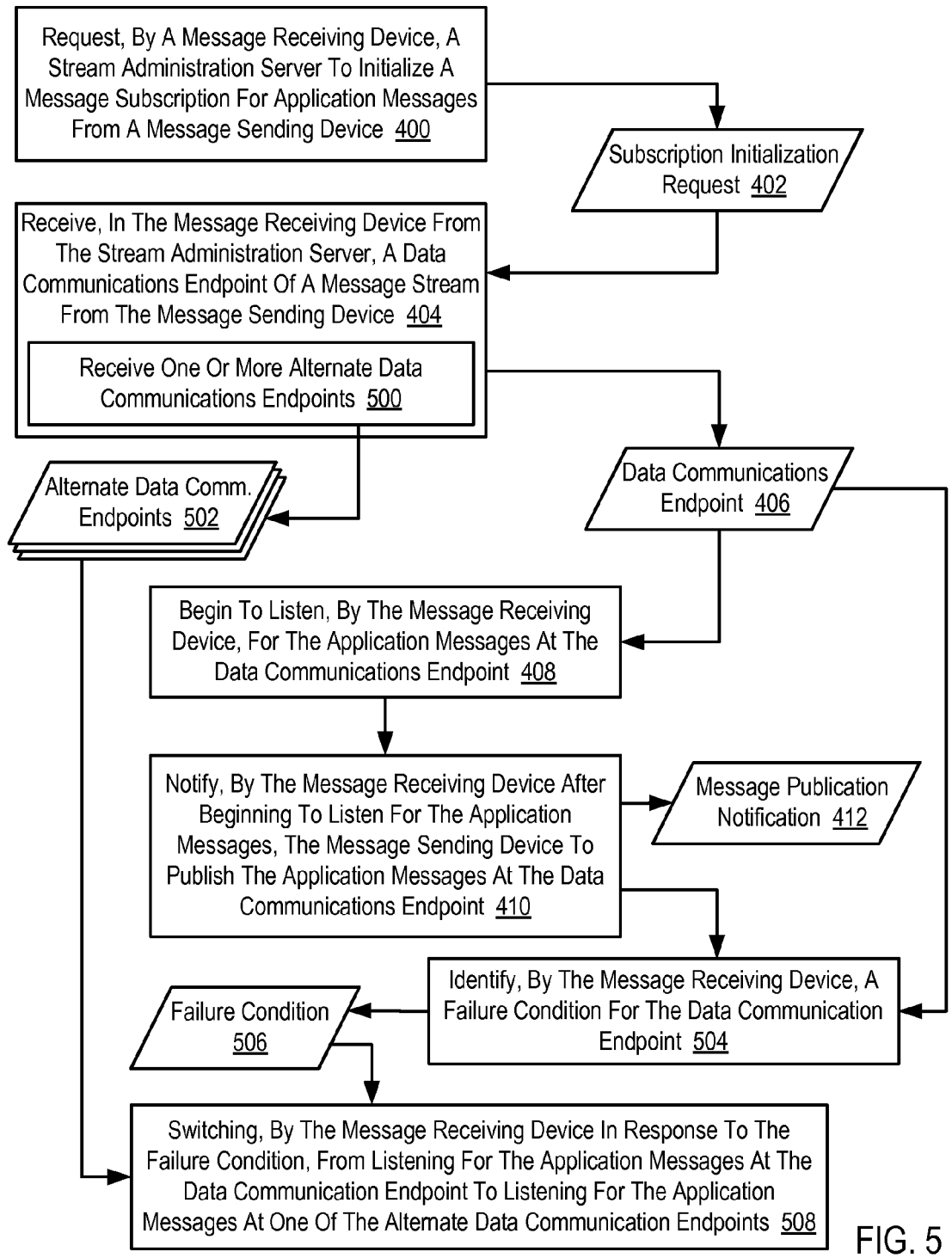
FIG. 5 sets forth a flowchart illustrating a further exemplary method of subscribing for application messages in a multicast messaging environment according to exemplary embodiments of the present invention.

The method of FIG. 5 is similar to the method of FIG. 4. That is, the method of FIG. 5 includes: requesting (400), by a message receiving device, a stream administration server to initialize a message subscription for application messages from a message sending device; receiving (404), in the message receiving device from the stream administration server, a data communications endpoint (406) of a multicast message stream from the message sending device; beginning to listen (408), by the message receiving device, for the application messages at the data communications endpoint; and notifying (410), by the message receiving device after beginning to listen for the application messages, the message sending device to publish the application messages at the data communications endpoint. The example of FIG. 5 is also similar to the example of FIG. 4 in that the example of FIG. 5 includes a subscription initialization request (402) and a message publication notification (412).

In the method of FIG. 5, receiving (404) a data communications endpoint (406) of a multicast message stream from the message sending device includes receiving (500), in addition to the data communications endpoint, one or more alternate data communications endpoints (502). Each alternate data communications endpoint (502) represents a data structure that includes a network address at which the message receiving device may listen for application messages from an alternate message sending device. As mentioned above, the stream administration server typically obtains the network addresses at which a message receiving device may listen for application messages from the alternate message sending devices. The data communications endpoint (406) of FIG. 4 may be implemented according to the UDP/IP protocols, the PGM protocol, or any other data communications protocols as will occur to those of skill in the art.

The method of FIG. 5 also includes identifying (504), by the message receiving device, a failure condition (506) for the data communication endpoint (406). The failure condition (506) represents a set of constraints for the data communication endpoint (406) that specify when a message receiving device should switch to an alternate endpoint (502). For example, the failure condition (506) may specify that the message receiving device should switch to an alternate endpoint if no messages are received through the endpoint (406) after a predetermined time period. For further example, the failure condition (506) may specify that the message receiving device should switch to an alternate endpoint when the message receiving device receives a failure notification message from a message sending device. The message receiving device may identify (504) a failure condition (506) for the data communication endpoint (406) according to the method of FIG. 5 by periodically determining whether any constraints for the data communication endpoint (406) of the failure condition (506) have occurred. If any of the constraints of the failure condition (506) have occurred, then the message receiving device has identified a failure condition (506).

The method of FIG. 5 also includes switching (508), by the message receiving device in response to the failure condition (506), from listening for the application messages at the data communication endpoint (406) to listening for the application messages at one of the alternate data communication endpoints (502). The message receiving device may switch (508) from listening for the application messages at the data communication endpoint (406) to listening for the application messages at one of the alternate data communication endpoints (502) according to the method of FIG. 5 by calling functions from a transport engine API of a transport engine installed on the message receiving device that stop listening for application messages at the endpoint (406) and start listening for application messages at one of the alternate endpoints (502). For example, consider the following exemplary functions useful for subscribing for application messages in a multicast messaging environment according to embodiments of the present invention:

void transport_stop_listen(int endpoint_ID);
    buffer*transport_listen(int endpoint_ID);

The exemplary function 'transport_stop_listen' instructs the transport engine of the message receiving device to stop listening for application messages at a data communication endpoint identified by the value for the 'endpoint_ID.' As described above, the exemplary function 'transport_listen' instructs the transport engine of the message receiving device to listen for application message at a data communications endpoint identified by the value for the 'endpoint_ID.' The exemplary function 'transport_listen' returns an address in computer memory for a buffer in which the transport engine places application messages received through the data communications endpoint. Readers will note that the exemplary functions described above are for explanation and not for limitation. In fact, other exemplary functions as will occur to those of skill in the art may also be useful in subscribing for application messages in a multicast messaging environment according to embodiments of the present invention.

In a financial market data environment, message sending devices are often implemented as feed adapters capable of converting application messages having a first format from a feed source to application messages having a second format for transmission to message receiving devices such as, for example, subscribing client devices. The financial costs of operating a feed adapter largely depends on the number of application messages the feed adapter receives from the feed source. It is advantageous, therefore, for the feed adapter to only receive the application messages for which the feed adapter has subscribers. As such, the feed adapter monitors the number of subscribers for each type of application message transmitted by the feed adapter. For further explanation, therefore, FIG. 6 sets forth a flowchart illustrating a further exemplary method of subscribing for application messages in a multicast messaging environment according to embodiments of the present invention that includes increasing (602), by the message sending device in response to receiving the notification (412) to publish the application messages, a value (604) for a computer data element representing subscriber interest in the application messages.

Figure 6:
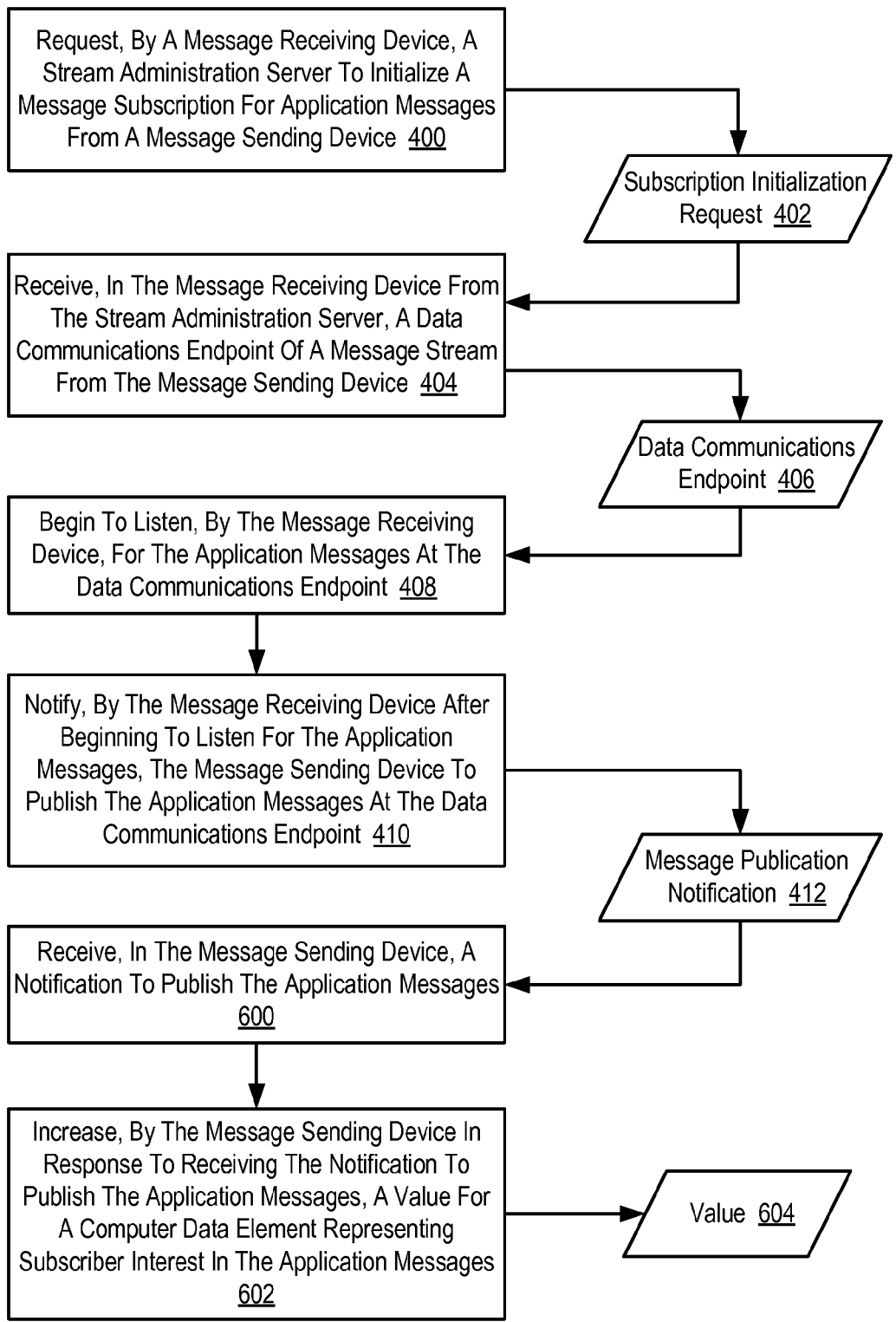
FIG. 6 sets forth a flowchart illustrating a further exemplary method of subscribing for application messages in a multicast messaging environment according to exemplary embodiments of the present invention.

The method of FIG. 6 is similar to the method of FIG. 4. That is, the method of FIG. 6 includes: requesting (400), by a message receiving device, a stream administration server to initialize a message subscription for application messages from a message sending device; receiving (404), in the message receiving device from the stream administration server, a data communications endpoint (406) of a multicast message stream from the message sending device; beginning to listen (408), by the message receiving device, for the application messages at the data communications endpoint; and notifying (410), by the message receiving device after beginning to listen for the application messages, the message sending device to publish the application messages at the data communications endpoint (406). The example of FIG. 6 is also similar to the example of FIG. 4 in that the example of FIG. 6 includes a subscription initialization request (402) and a message publication notification (412).

The method of FIG. 6 also includes receiving (600), in the message sending device, a notification (412) to publish the application messages. The message sending device may receive (600) the message publication notification (412) from the message sending device through the message administration server or directly from the message sending device itself. Typically the stream administration server or the message sending device transmits the message publication notification (412) to the message sending device through an administrative data communications connection implemented using UDP/IP, TCP/IP, or any other data communications protocols as will occur to those of skill in the art.

The method of FIG. 6 also includes increasing (602), by the message sending device in response to receiving the notification (412) to publish the application messages, a value (604) for a computer data element representing subscriber interest in the application messages. The message sending device may increase (602) the value (604) according to the method of FIG. 6 by incrementing the value (604) by one for each message publication notification (412) received. Using the value (604), the message sending device may monitor the number of subscribers for the application messages transmitted by the device.

Figure 7:
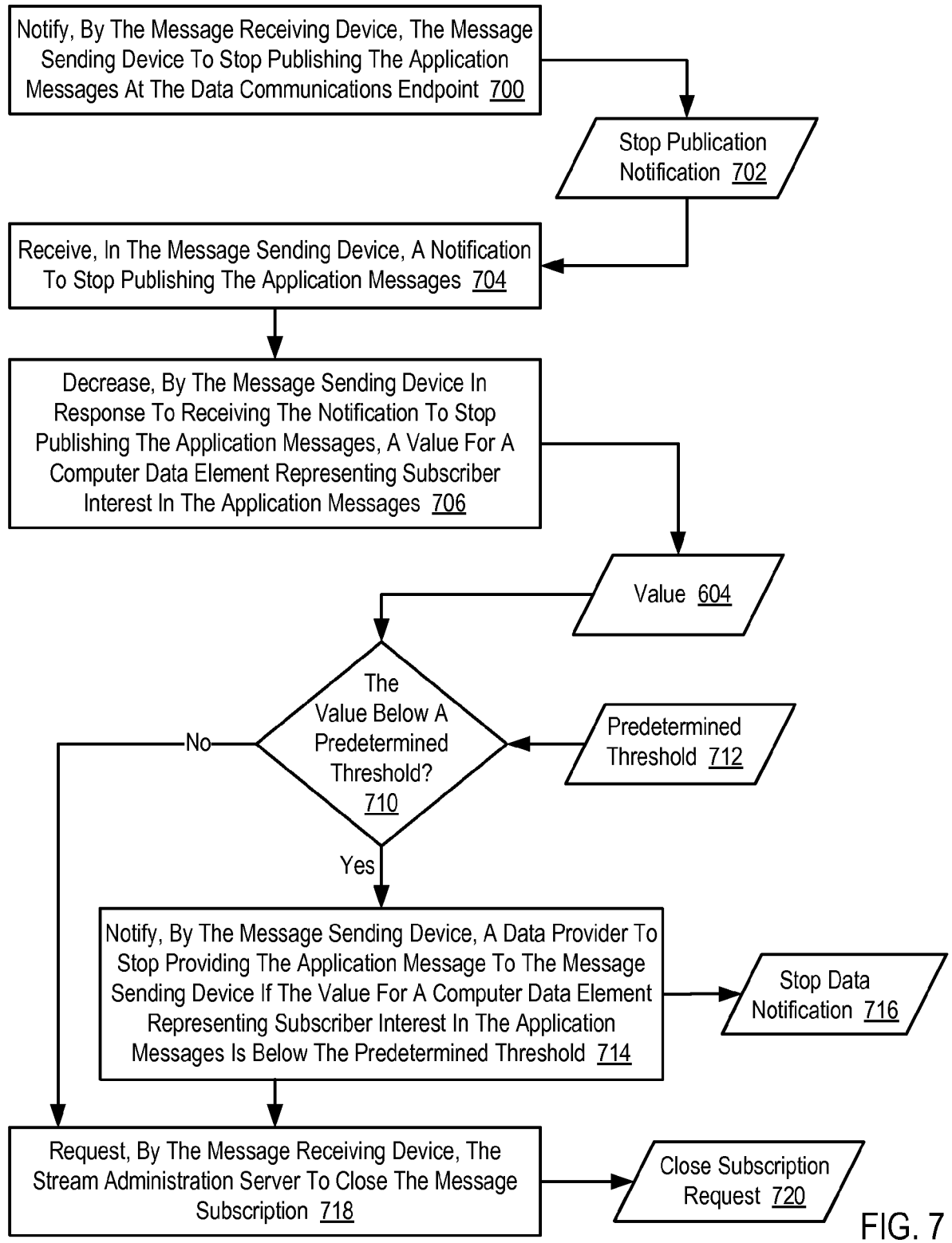
FIG. 7 sets forth a flowchart illustrating a further exemplary method of subscribing for application messages in a multicast messaging environment according to exemplary embodiments of the present invention.

The method of FIG. 6 describes the response of a message sending device to receiving a message publication notification. Turning now to FIG. 7: FIG. 7 describes the response of a message sending device to receiving a notification to stop publishing application messages. Therefore, FIG. 7 sets forth a flowchart illustrating a further exemplary method of subscribing for application messages in a multicast messaging environment according to embodiments of the present invention that includes notifying (700), by the message receiving device, the message sending device to stop publishing the application messages at the data communications endpoint. The message receiving device may notify (700) the message sending device to stop publishing the application messages at the data communications endpoint according to the method of FIG. 7 by transmitting a stop publication notification (702) to the stream administration server. The stream administration server, then in turn, may instruct the message sending device to stop publishing the messages at the network address specified in the data communication endpoint. The stop publication notification (702) may be implemented as an XML document, a call to a member method of a RMI object on the message receiving device, or any other implementation as will occur to those of skill in the art.

The method of FIG. 7 also includes receiving (704), in the message sending device, a notification (702) to stop publishing the application messages. The message sending device may receive (704) the stop publication notification (702) from the message sending device through the message administration server or directly from the message sending device itself. Typically the stream administration server or the message sending device transmits the stop publication notification (702) to the message sending device through an administrative data communications connection implemented using UDP/IP, TCP/IP, or any other data communications protocols as will occur to those of skill in the art.

The method of FIG. 7 includes decreasing (706), by the message sending device in response to receiving the notification to stop publishing the application messages, a value (604) for a computer data element representing subscriber interest in the application messages. The message sending device may decrease (706) the value (604) according to the method of FIG. 7 by decrementing the value (604) by one for each stop publication notification (412) received.

The method of FIG. 7 also includes determining (710), by the message sending device, whether the value (604) for a computer data element representing subscriber interest in the application messages is below a predetermined threshold (712). The predetermined threshold (712) represents a value used to identify when the message sending device should notify a data provider to stop providing application messages. Typically, the predetermined threshold (712) is set to one. The message sending device may determine (710) whether the value (604) is below a predetermined threshold (712) by comparing the value (604) with the predetermined threshold (712). If the value (604) is less than the predetermined threshold (712), then the value (604) is below a predetermined threshold (712). If the value (604) is greater than or equal to the predetermined threshold (712), then the value (604) is not below a predetermined threshold (712).

The method of FIG. 7 includes notifying (714), by the message sending device, a data provider to stop providing the application message to the message sending device if the value (604) for a computer data element representing subscriber interest in the application messages is below the predetermined threshold (712). The message sending device may notify (714) the data provider to stop providing the application message to the message sending device according to the method of FIG. 7 by transmitting a stop data notification (716) to the data provider. The message sending device typically transmits the stop data notification (716) to the data provider through an administration message stream implemented using UDP/IP, TCP/IP, or any other data communications connection as will occur to those of skill in the art. The stop data notification (716) may be implemented as an XML document, a call to a member method of a RMI object on the message sending device, or any other implementation as will occur to those of skill in the art. Readers will note that notifying (714) a data provider to stop providing the application message to the message sending device if the value (604) for a computer data element representing subscriber interest in the application messages is below the predetermined threshold (712) advantageously prevents a message sending device from acquiring application messages for retransmission for which no message receiving device is subscribed.

The method of FIG. 7 also includes requesting (718), by the message receiving device, the stream administration server to close the message subscription regardless of whether or not the value (604) is below the predetermined threshold (712). The message receiving device may requests (718) the stream administration server to close the message subscription according to method of FIG. 7 after notifying the message sending device to stop publishing the application messages. Requesting (718) the stream administration server to close the message subscription according to the method of FIG. 7 allows the stream administration server to reallocate any computer resources utilized to initialize and administer the message subscription for the message receiving device.

The message receiving device may request (718) the stream administration server to close the message subscription according to method of FIG. 7 by calling a function from an API of a stream administration library installed on the message receiving device that closes the message subscription. For example, consider the following exemplary function useful for subscribing for application messages in a multicast messaging environment according to embodiments of the present invention:

void close_subscription(int subscription_ID);

The exemplary function 'close_subscription' instructs the stream administration server to close the message subscription identified by the value for the 'subscription_ID.' The exemplary function 'close_subscription' may be part of a remote Java RMI™ object or a CORBA object instantiated on the message receiving device. Readers will note that the exemplary function described above is for explanation and not for limitation. In fact, other exemplary functions as will occur to those of skill in the art may also be useful in subscribing for application messages in a multicast messaging environment according to embodiments of the present invention.

In view of the explanations set forth above in this document, readers will recognize that subscribing for application messages in a multicast messaging environment according to embodiments of the present invention provides the following benefits:

an enhanced ability to prevent a message receiving device from missing the first messages transmitted after the subscription is initialized in a multicast messaging environment, and an ability to prevent a message sending device from acquiring application messages for retransmission for which the message sending device has no subscribers.

Exemplary embodiments of the present invention are described largely in the context of a fully functional computer system for subscribing for application messages in a multicast messaging environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of subscribing for application messages in a multicast messaging environment, the method comprising:

requesting, by a message receiving device, a stream administration server to initialize a message subscription for application messages related to a topic from a message sending device, wherein said requesting comprises transmitting to the stream administration server a request that indicates the topic and security credentials of the message receiving device for the stream administration server to authenticate and authorize the message receiving device;

receiving, in the message receiving device from the stream administration server, a data communications endpoint that at least indicates a multicast network address for a multicast message stream from the message sending device;

beginning to listen, by the message receiving device, for the application messages at the data communications endpoint; and transmitting, by the message receiving device only after beginning to listen for the application messages related to the topic, to the stream administration server a notification that notifies the message sending device to publish the application messages to the multicast network address.

2. The method of claim 1 further comprising:

receiving, in addition to the data communications endpoint, one or more alternate data communications endpoints, identifying, by the message receiving, device, a failure condition for the data communications endpoint;

switching, by the message receiving device in response to the failure condition, from listening for the application messages at the data communications endpoint to listening for the application messages at one of the alternate data communications endpoints.

3. The method of claim 1 further comprising:

receiving, in the message sending device, a notification to publish the application messages; and increasing, by the message sending device in response to receiving the notification to publish the application messages, a value for a computer data element representing subscriber interest in the application messages.

4. The method of claim 1 further comprising notifying, by the message receiving device, the message sending device to stop publishing the application messages at the data communications endpoint.

5. The method of claim 1 further comprising:

receiving, in the message sending device, a notification to stop publishing the application messages;

decreasing, by the message sending device in response to receiving the notification to stop publishing the application messages, a value for a computer data element representing subscriber interest in the application messages;

determining, by the message sending device, whether the value for a computer data element representing subscriber interest in the application messages is below a predetermined threshold and notifying, by the message sending device, a data provider to stop providing the application message to the message sending device if the value for a computer data element representing subscriber interest in the application messages is below the predetermined threshold.

6. The method of claim 1 further comprising requesting, by the message receiving device, the stream administration server to close the message subscription.

7. The method of claim 1 wherein the application messages comprise financial market data.

8. A system for subscribing for application messages in a multicast messaging environment, the system comprising one or more computer processors, computer memory operatively coupled to the one or more computer processors the computer memory having disposed within it computer program instructions executable by the one or more computer processors to cause the system to perform operations comprising:

requesting, a stream administration server to initialize a message subscription for application messages related to a topic from a message sending device, wherein said requesting comprises transmitting to the stream administration server a request that indicates the topic and security credentials of a message recipient for the stream administration server to authenticate and authorize the message recipient;

receiving, from the stream administration server, a data communications endpoint that at least indicates a multicast network address for a multicast message stream from the message sending device;

beginning to listen for the application messages at the data communications endpoint; and transmitting, only after beginning to listen for the application messages related to the topic, to the stream administration server a notification that notifies the message sending device to publish the application messages to the multicast network address.

9. The system of claim 8 further comprising computer program instructions executable by the one or more processors to cause the system to perform operations comprising:

receiving, in the message sending device, a notification to publish the application messages; and increasing, by the message sending device in response to receiving the notification to publish the application messages a value for a computer data element representing subscriber interest in the application messages.

10. The system of claim 8 further comprising computer program instructions executable by the one or more processors to cause the system to perform operations comprising notifying the message sending device to stop publishing the application messages at the data communications endpoint.

11. The system of claim 8 further comprising computer program instructions executable by the one or more processors to cause the system to perform operations comprising:

receiving, in the message sending device, a notification to stop publishing the application messages;

decreasing, by the message sending device in response to receiving the notification to stop publishing the application messages, a value for a computer data element representing subscriber interest in the application messages;

determining, by the message sending device, whether the value for a computer data element representing subscriber interest in the application messages is below a predetermined threshold; and notifying, by the message sending device, a data provider to stop providing the application message to the message sending device if the value for a computer data element representing subscriber interest in the application messages is below the predetermined threshold.

12. The system of claim 8 further comprising computer program instructions executable by the one or more processors to cause the system to perform operations comprising requesting the stream administration server to close the message subscription.

13. A computer program product for subscribing to application messages in a multicast messaging environment, the computer program product disposed upon a recordable medium, the computer program product comprising computer program instructions to:

request a stream administration server to initialize a message subscription for application messages related to a topic from a message sending device, wherein the computer program instructions to request the stream administration server to initialize a message subscription for application messages related to a topic comprises computer program instructions to transmit to the stream administration server a request that indicates the topic and security credentials of a message recipient for the stream administration server to authenticate and authorize the message recipient;

receive from the stream administration server, a data communications endpoint that at least indicates a multicast network address for a multicast message stream from the message sending device;

begin to listen, for the application messages at the data communications endpoint; and transmit, only after beginning to listen for the application messages related to the topic, to the stream administration server a notification that notifies the message sending device to publish the application messages to the multicast network address.

14. The computer program product of claim 13 wherein the computer program instructions further comprise computer program instructions to:

receive, in addition to the data communications endpoint, one or more alternate data communications endpoints;

identify a failure condition for the data communications endpoint;

switch, in response to the failure condition, from listening for the application messages at the data communications endpoint to listening for the application messages at one of the alternate data communications endpoints.

15. The computer program product of claim 13 further comprising computer program instructions to:

receive, in the message sending device, a notification to publish the application messages; and increase, by the message sending device in response to receiving the notification to publish the application messages, a value for a computer data element representing subscriber interest in the application messages.

16. The computer program product of claim 13 further comprising computer program instructions to notify the message sending device to stop publishing the application messages at the data communications endpoint.

17. The computer program product of claim 13 further comprising computer program instructions to:

receive, in the message sending device, a notification to stop publishing the application messages;

decrease, by the message sending device in response to receiving the notification to stop publishing the application messages, a value for a computer data element representing subscriber interest in the application messages;

determine, by the message sending device, whether the value for a computer data element representing subscriber interest in the application messages is below a predetermined threshold; and notify, by the message sending device, a data provider to stop providing the application message to the message sending device if the value for a computer data element representing subscriber interest in the application messages is below the predetermined threshold.

18. The computer program product of claim 13 further comprising computer program instructions to request the stream administration server to close the message subscription.

* * * * *